Jan. 29, 1957         H. SCHARF        2,779,082
HEAT TREATMENT OF CERAMIC MATERIALS
Filed May 12, 1951
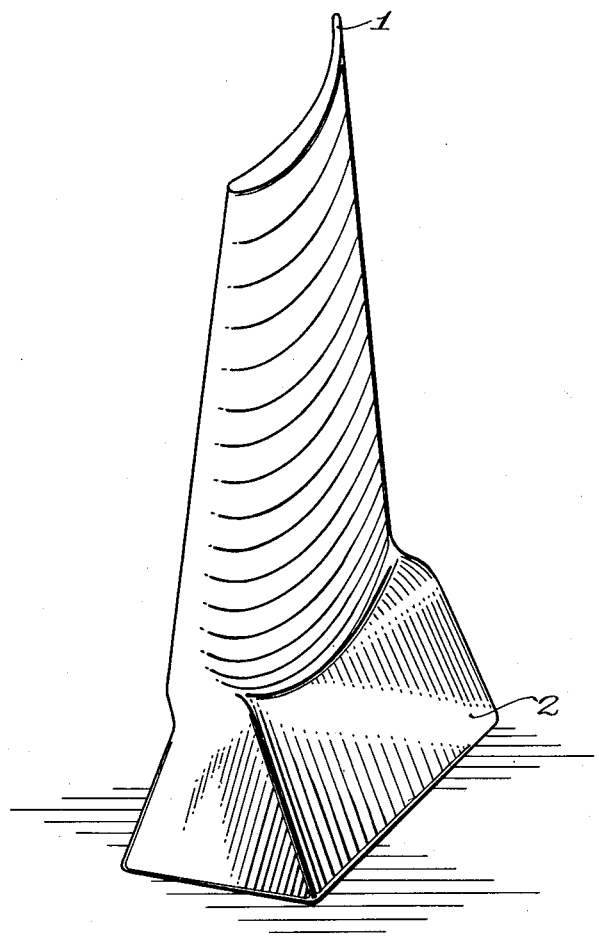
INVENTOR
HERBERT SCHARF
BY *Marechal & Biebel*
ATTORNEYS

United States Patent Office 2,779,082
Patented Jan. 29, 1957

2,779,082

HEAT TREATMENT OF CERAMIC MATERIALS

Herbert Scharf, Augsburg, Germany, assignor to Maschinenfabrik Augsburg-Nurnberg A. G., Augsburg, Germany, a corporation of the German Republic Application May 12, 1951, Serial No. 226,061

3 Claims. (Cl. 25—157)

This invention relates to a method of heat treating ceramic materials for improving their properties, more particularly their mechanical strength.

Ceramic materials contrary to metallic materials have relatively poor strength properties. This applies especially for their tensile strength, so that a high brittleness is resulting from the unfavorable proportion of bending or transverse strength to tensile strength $$n = \frac{G_{bB}}{G_{zB}}$$

These poor mechanical strength properties so far have formed a handicap for the use of ceramic materials in various technical fields where they would be more suitable than the conventional metallic materials, e. g., owing to their favorable mechanical properties at high temperature service.

By detailed researches it was found that the mechanical properties of the ceramic materials similar to those of metals depend on their crystal structure and that it is possible, even with ceramic materials, to control the crystallographic transformations, caused by heat treatment, in such a manner that the ceramic materials assume much more favorable strength properties. In cooling slowly from the molten state, a ceramic material may undergo transformations of its crystalline texture and structure with crystals of a certain initial form separating from the molten mass. After a further decline in temperature this initial crystal form may suddenly change into another and different form of crystal (e. g., space-centered or surface centered), each of these differing crystal forms contributing characteristic properties to the ceramic mass.

Therefore, according to the present invention the ceramic materials are subjected to heat treatment in such a manner that it is heated, after the ceramic firing, to a temperature below the softening point, maintained at this temperature for a certain time, and then rapidly cooled. For instance, by slowly heating a ceramic body consisting of 70 percent by weight of steatite and 30 percent carbide of silicium, to 1150° C., during a period of about 6 hours, then maintaining it at this temperature for a period of one hour, and finally cooling the ceramic body at a high rate of speed, to a temperature below 800°, e. g. in stagnant air or in an air current, the tensile strength of the ceramic body will rise from 3.0 kg./mm.$^2$ to 5.5 kgs. per mm.$^2$, while the brittleness simultaneously is decreased.

The process in the material occurring in the above mentioned example is based on effects of the transformation of crystals taking place above 850° C. and partly being reversible. The irreversible share owing to the transition into another form of crystallization is connected with an increase of the volume of a certain kind of crystal, causing also an increase of the volume of the whole body. The conditions of the internal structural strains, i. e., the microscopic tensions between the various types of crystals, which are typical for the behaviour, more particularly of the brittle ceramic materials, are substantially affected by these processes, i. e., as shown by the above example, in such a manner that the tensile strength is increased considerably while the brittleness is decreased. The reversible share of the transformation is substantially suppressed by rapid passing of the lower temperature of transformation (in the example about 850° C.) by rapid cooling. It will be understood that the temperature used in the heat treatment also must not exceed an upper limit which in general is determined by the softening print.

Where transformations of several types of crystals take place in the temperature range in which the heat treatment is carried out, the heat treatment is preferably effected in steps in such a manner that the single transformations may take place without disturbances.

Depending on the ceramic material to be heated, the heating may be carried out in an inert, reducing or oxidizing atmosphere. The cooling may be effected in the same or in another gas. Baths of liquids or powders may also be used for cooling, as the case may be. Thus the cooling can be controlled in any desired manner.

For the example hereinbefore described, a slightly reducing or neutral atmosphere is advantageous during the heat treatment while the cooling after the heat treatment is preferably carried out in stagnant air or in an air current, making the cooling speed as high as possible. However, regard must be paid to the thermal shock resistance of the respective material. Generally it is preferred to discontinue the rapid cooling on reaching of a predetermined temperature, e. g., the lower transformation temperature, and then to effect the further cooling at a lower rate of speed.

If desired the heat treatment may be combined with the finish-firing of the ceramic workpiece, in such a manner that the cooling of the finish-fired workpiece is controlled in the required manner, thus saving the step of heating the workpiece to the transformation temperature.

Owing to their better strength properties and their reduced brittleness, ceramic materials heat-treated according to the present invention can be used for various technical purposes for which they could not hitherto be used. For instance, highly stressed burners or turbine blades may be made of ceramic materials which have been heat treated by the process according to the present invention.

A turbine blade which may be made of the novel heat-treated ceramic material has been shown in the drawing by way of example, in a perspective view. Such a blade comprises a vane portion 1 of predetermined airfoil contour and a root portion 2 of preformed size and shape adapted to be affixed into a turbine rotor for firm but noncompressing engagement therewith even under extreme variations of temperature and high mechanical strength from vibrational and centrifugal forces.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a process for heat treating and tempering a fired ceramic part having a plurality of kinds of crystals which undergo crystallographic transformations upon heating to different predetermined transformation temperatures for increasing the tensile strength and decreasing the brittleness of said part, the steps which comprise heating said fired ceramic part to a treating temperature below the softening point thereof but higher than the highest of the transformation temperatures for said crystals, maintaining said part at said treating temperature for a predetermined time effecting crystallographic transformation of one of said kinds of crystals from said initial crystal structure thereof to a tempered crystal structure, rapidly cooling said part to a temperature below said treating temperature before said tempered crystal structure reverts to said initial crystal structure, and repeating said maintaining and cooling steps with respect to a lower treating temperature for another of said kinds of crystals subject to crystallographic transformation at said lower treating temperature.

2. In a process for heat treating and tempering a ceramic part having a plurality of kinds of crystals susceptible to reversible crystallographic transformation at different temperatures to increase the tensile strength and decrease the brittleness of said part, the steps which comprise firing said ceramic part producing an initial crystal structure for said kinds of crystals therein, maintaining said fired part at a treating temperature below the softening point thereof but above the highest of the transformation temperatures of said crystals for a predetermined time effecting transformation of said initial crystal structure of one of said kinds of crystals to a tempered crystal structure, rapidly cooling said part to a temperature below said highest transformation temperature before said tempered crystal structure reverts to said initial crystal structure, slowly cooling said part to another lower treating temperature above said next highest transformation temperature, then rapidly cooling said part to a temperature below said next highest transformation temperature before another of said kinds of crystals reverts from a tempered crystal structure to said initial crystal structure, and repeating said rapid and slow cooling steps for said different kinds of crystals in said part.

3. A process of producing fired and subsequently heat treated ceramic bodies of a high mechanical strength, comprising the steps of shaping a ceramic body of a mixture of 70 percent by weight of steatite and 30 percent of silicon carbide, firing the body at a temperature substantially above 1150° C. to form a solid article, heating said fired body after said firing thereof within a period of 6 hours to 1150° C., maintaining said body at this temperature for one hour, and then rapidly cooling the body to a temperature below 800° C.

References Cited in the file of this patent

UNITED STATES PATENTS

| | | |
|---|---|---|
| 1,752,867 | Trostel | Apr. 1, 1930 |
| 1,814,012 | Taft | July 14, 1931 |
| 2,043,222 | Bartsch | June 9, 1936 |
| 2,124,538 | Boyer | July 26, 1938 |
| 2,369,266 | Thurnauer | Feb. 13, 1945 |
| 2,524,601 | Riddle | Oct. 3, 1950 |
| 2,530,506 | Buchwald et al. | Nov. 21, 1950 |
| 2,624,097 | Kistler | Jan. 6, 1953 |

OTHER REFERENCES

Searle: The Chemistry and Physics of Clays and Other Ceramic Materials, 1924, published by Ernest Benn, Limited, London, England.